United States Patent [19]

Feigel

[11] Patent Number: 5,487,455

[45] Date of Patent: Jan. 30, 1996

[54] VARIABLE FLOW VALVE WITH POSITION SENSOR

[75] Inventor: Hans-Jörg Feigel, Rosbach, Germany

[73] Assignee: ITT Automotive Europe GmbH, Germany

[21] Appl. No.: 295,684

[22] PCT Filed: Feb. 13, 1993

[86] PCT No.: PCT/EP93/00353

§ 371 Date: Aug. 24, 1994

§ 102(e) Date: Aug. 24, 1994

[87] PCT Pub. No.: WO93/17254

PCT Pub. Date: Sep. 2, 1993

[30] Foreign Application Priority Data

Feb. 29, 1992 [DE] Germany .......................... 42 06 380.9

[51] Int. Cl.⁶ ............................... F16F 9/46; B60G 17/08
[52] U.S. Cl. ....................... 188/299; 188/1.11; 137/487.5; 251/129.21
[58] Field of Search ................. 137/487.5; 251/129.08, 251/129.21, 343, 905; 280/707, 714; 188/299, 322.13, 322.19, 313, 314, 315, 381–320, 1.11 R, 1.11 E

[56] References Cited

U.S. PATENT DOCUMENTS

| | | | |
|---|---|---|---|
| 4,638,670 | 1/1987 | Moser | 188/1.11 E X |
| 4,880,086 | 11/1989 | Knecht et al. | 188/318 X |
| 5,067,687 | 11/1991 | Patel et al. | 188/299 X |
| 5,180,039 | 1/1993 | Axthammer et al. | 188/315 X |

FOREIGN PATENT DOCUMENTS

| | | |
|---|---|---|
| 0288736 | 3/1988 | European Pat. Off. |
| 0399326 | 5/1990 | European Pat. Off. |
| 3712477 | 4/1989 | Germany . |
| WO9112452 | 8/1991 | WIPO . |

*Primary Examiner*—Josie A. Ballato
*Attorney, Agent, or Firm*—Dykema Gossett

[57] ABSTRACT

A directly actuated vibration absorber valve for controllable vibration absorbers. The valve includes a valve body that is actuatable by an electromechanical transducer. In the range of low volumetric flow rates an output signal is conveyed to an electric circuit which actuates the electromechanical transducer in such a way that a greater restricting function is imposed than that imposed during a second range of volumetric flow rates.

23 Claims, 3 Drawing Sheets

FIG 3
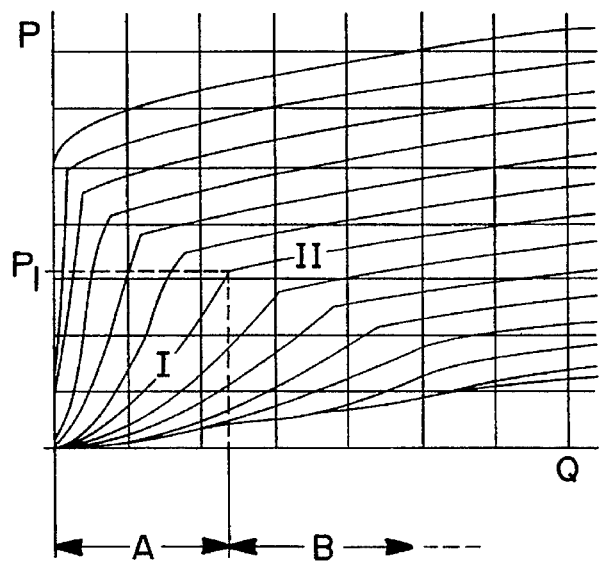
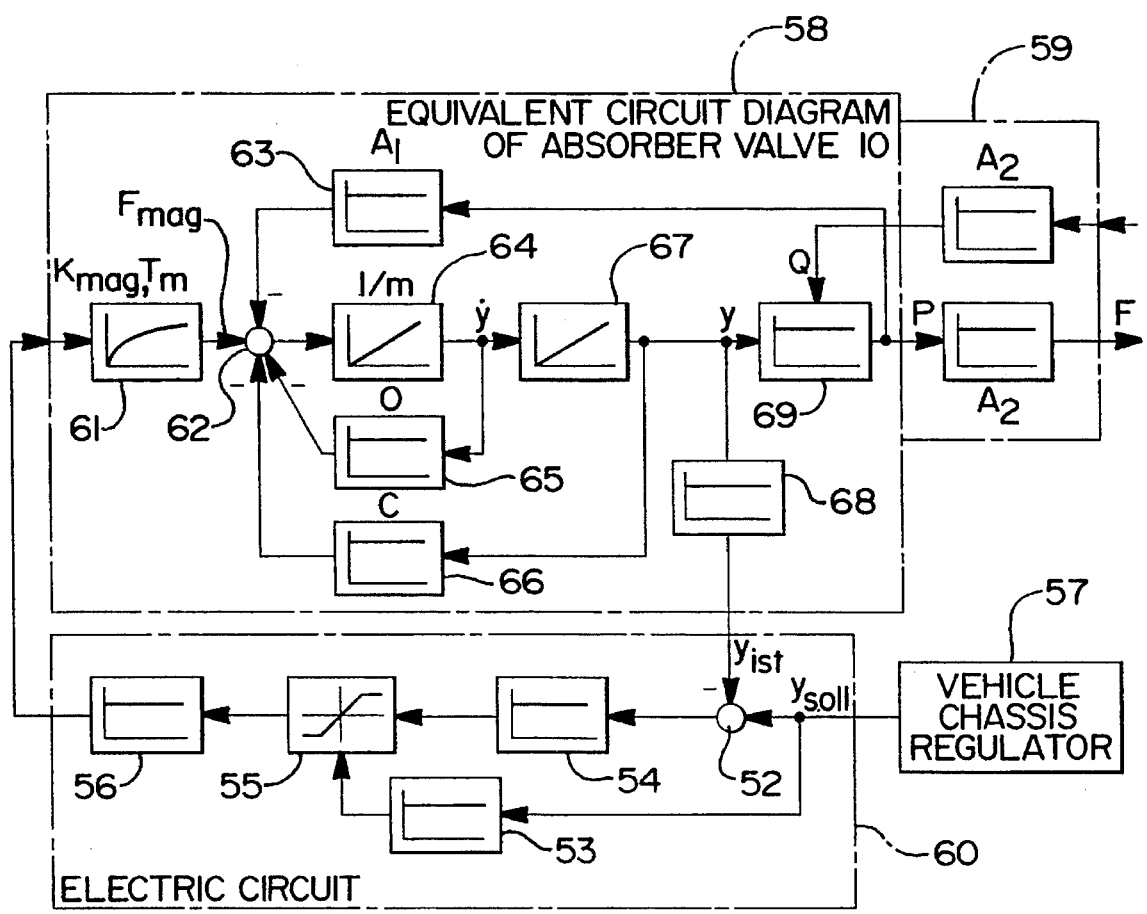
FIG 4

VARIABLE FLOW VALVE WITH POSITION SENSOR

TECHNICAL FIELD

The invention is related to a directly actuated vibration absorber valves and more particularly to directly actuated vibration absorber valves for controllable vibration absorbers with a pressure-unbalanced valve body being actuatable by an electromechanical transducer.

BACKGROUND OF THE INVENTION

A vibration absorber valve of this kind is known, for example, from the German patent specification No. 37 12 477. The particular feature of the prior-art vibration absorber valve consists in that at least a part of the front surface of its valve body and valve seat are disposed at a distance from each other (the ratio of the pressurized front surface relative to the rear pressurized front surface being 0.5–1 and the ratio of a pressurized annular surface relative to the rear pressurized front surface being 0–0.5). This design provides for an optionally adjustable vibration absorption in the traction stage and in the thrust stage. This function is made possible primarily due to the hydraulically pressurized functional surfaces of the valve body, the switching behavior of the armature design and the use of a solenoid which forms the electro-mechanical transducer.

The above referenced vibration absorber valve has the disadvantage that the (particularly in the range of low volumetric flow rates which pass through the vibration absorber valve) no restricting function can be attained independent of the absorber pressure. In the range of the pressure-dependent restricting function the above referenced vibration absorber valve represents a control loop which determines its dynamic behavior, so that a controllable vibration absorber equipped with such an absorber valve is less adapted for use in a semiactive chassis regulating system. A further advantage is seen in the fact that the family of characteristics of a vibration absorber of this kind is fixed by the dimensioning of the component parts of the vibration absorber valve and cannot, for example, be modified during driving in the event of an adaptive chassis control action.

It is, therefore, the object of the present invention to propose a vibration absorber valve of the kind which the influence the absorber pressure has on the restricting function in the range of low volumetric flow rates is minimized. Simultaneously the dynamic behavior in the chassis regulating process is to be improved. A further object is provide a vibration absorber valve that can be electrically altered to provide a family of response characteristics.

According to the invention, this object is attained in that the valve body is directly coupled to a measuring apparatus which monitors the actuating travel of the valve body and whose output signal is conveyed to an electric circuit which actuates the electromechanical transducer in such a way that in a first range of volumetric flow rate a restricting function and in a second range of volumetric flow rate a pressure-limiting function are performed.

As to process, the solution of the forementioned object consists in that the output signals of the regulator are conveyed, on one hand, to a comparator circuit jointly with output signals of the measuring apparatus monitoring the actuating travel of the valve body and, on the other hand, to a first amplifier, within said comparator circuit a differential value being formed which is transmitted to a second amplifier, and in that the output signals of the two amplifiers are conveyed to a variable delimiter which limits the output signals of the second amplifier depending on the output signals of the first amplifier and conveys them to the electrical output stage of the vibration absorber valve.

In an advantageous further development a further improvement of the dynamic behavior of the inventive vibration absorber valve is attained in that the electromechanical transducer is configurated in the shape of a plunger coil which interacts with a permanent magnet and whose carrier forms the valve body.

Favorable conditions for a balancing of forces of flow occurring within the absorber valve and a coupling of the electromechanical transducer are created in a further development of the subject matter of the invention in that the valve body is configurated in the shape of a bushing which is slidingly guided on a cylindrical guide element and which interacts with cross-sectional areas of flow being provided in said guide element.

In this conjunction, it will be of particular advantage in the interest of a smooth functioning of the inventive vibration absorber valve, respectively of a vibration absorber equipped with it, if and when during the interaction of the valve body with said cross-sectional areas of flow a balancing of the hydraulic forces takes place which occur in the range of action. This provision affords, in addition, a reduction of the energy requirements of the electromechanical transducer.

In another advantageous development of the inventive thought the balancing of the forces of flow mentioned before is, for example, achieved in that the valve body and/or the chamber disposed downstream of the cross-sectional areas of flow as seen in the flow direction are configurated such that a deviation of the volumetric flow is ensured. In this configuration, the front surface of the bushing-shaped valve body has preferably the shape of a truncated cone.

According to a further inventive feature another possibility to counteract the forces of flow consists in that said cross-sectional areas of flow end up in an annular hydraulic chamber which is connected to the outlet of the valve arrangement in such a manner that the static pressure coming about in said annular chamber lets become effective a hydraulic force component which counteracts Bernouille forces acting on the valve body.

It will also be of advantage when radial pressure-relieving grooves are envisaged in the guide element which end up in a slot being configurated between the valve body and the guide element. By this measure the effect of the hydraulic clamping is prevented in this range.

In this context, said guide element is preferably furnished with pressure agent ducts which are linked to the slot and which are preceded by a filter element. As a result of this, a smooth supply of the slot with filtered oil is safeguarded, so that the risk of soiling is largely eliminated.

In a further design version of the invention, the risk of soiling of the inventive absorber valve is reduced in that an annular groove is provided in the range of the cross-sectional areas of flow. Only a short sealing slot with a slight pressure differential is disposed between the cross-sectional areas of flow and the annular slot, as a result whereof contaminants are impeded from entering into the slot.

In order to ensure that no pressure balance takes place at the valve body during operation, it is a bore is provided within the guide element. A cylindrical element is guided within the bore and is loosely axially abutted against the valve body.

In order to make sure that the function of the vibration absorber equipped with the inventive absorber valve is preserved even in the event of a failure of the electromechanical transducer (so-called fail-safe function), it is envisaged in a preferred embodiment of the subject matter of the invention that the valve body is suspended on a bending spring which is clamped in the valve housing. This provision is expedient in particular In conjunction with bidirectional transducers. The bending spring may, for example, be configurated as a spring plate which is furnished with passages. Furthermore, the bending spring can support the valve body, independently of the electro-mechanical transducer in order to further minimize the frictional effects.

A design version of the invention which is less expensive to manufacture and which reduces the space requirements. This design is distinguished by the measuring apparatus monitoring changes of magnetic variables which are caused by the adjustment of the valve body.

In this configuration, the measuring apparatus may preferably be formed by a permanent magnet being fixed to the valve body, respectively to an element coupled to it, and by a sensor element recording the changes of its magnetic field.

It is envisaged according to another advantageous further development of the subject matter of the invention (which is especially adapted for application at more elevated temperatures) that the sensor element is formed by a magneto-resistive element. However, said sensor element may also be formed from a Hall element.

A measuring apparatus working reliably, independent of the influence of external magnetic fields is constituted, for example, by a reflecting light barrier.

A sturdy measuring apparatus being insensitive to soiling may be configured in the shape of an arrangement working by the eddy current principle.

In the realization of the inventive process for the continuous adjustment of the vibration absorbing force of a vibration absorber being equipped with the absorber valve according to the invention it is of particular advantage that for chassis regulation purposes the pressure (p) adjusted within the vibration absorber allows, in the static condition, to be determined from the sensor signals and control signals through the following equation:

$$p = \frac{K_{mag} \cdot i - C \cdot y}{A_1} = K1 \cdot i + K2 \cdot y,$$

since the forces of flow are balanced. In the equation:

$K_{mag}$ is the proportional control factor of the electromechanical transducer, i is the current being supplied to the plunger coil, C is the spring rate of the bending spring, y is the actuating travel of the valve body, and $A_1$ is the area of the cylindrical element which is abutted with the valve body.

Further details, features and advantages of the invention will be revealed by the undermentioned description of one embodiment, making reference to the accompanying drawing.

BRIEF DESCRIPTION OF THE DRAWINGS

FIG. 3 is a graph of a family of response characteristics realized with the inventive absorber valve.

FIG. 4 is a signal flow diagram of a control loop for the control process according to the present invention.

FIG. 5A is a schematic view of a Magneto-Resistive element embodiment of sensor element 46; FIG. 5B is a schematic view of a Hall element embodiment of sensor element 46; FIG. 5C is a schematic view of a reflecting light barrier version of measuring apparatus 30; FIG. 5D is a schematic view of an Eddy Current Principle Arrangement version of measuring apparatus 30.

DETAILED DESCRIPTION OF THE PREFERRED EMBODIMENTS

Figure 1:
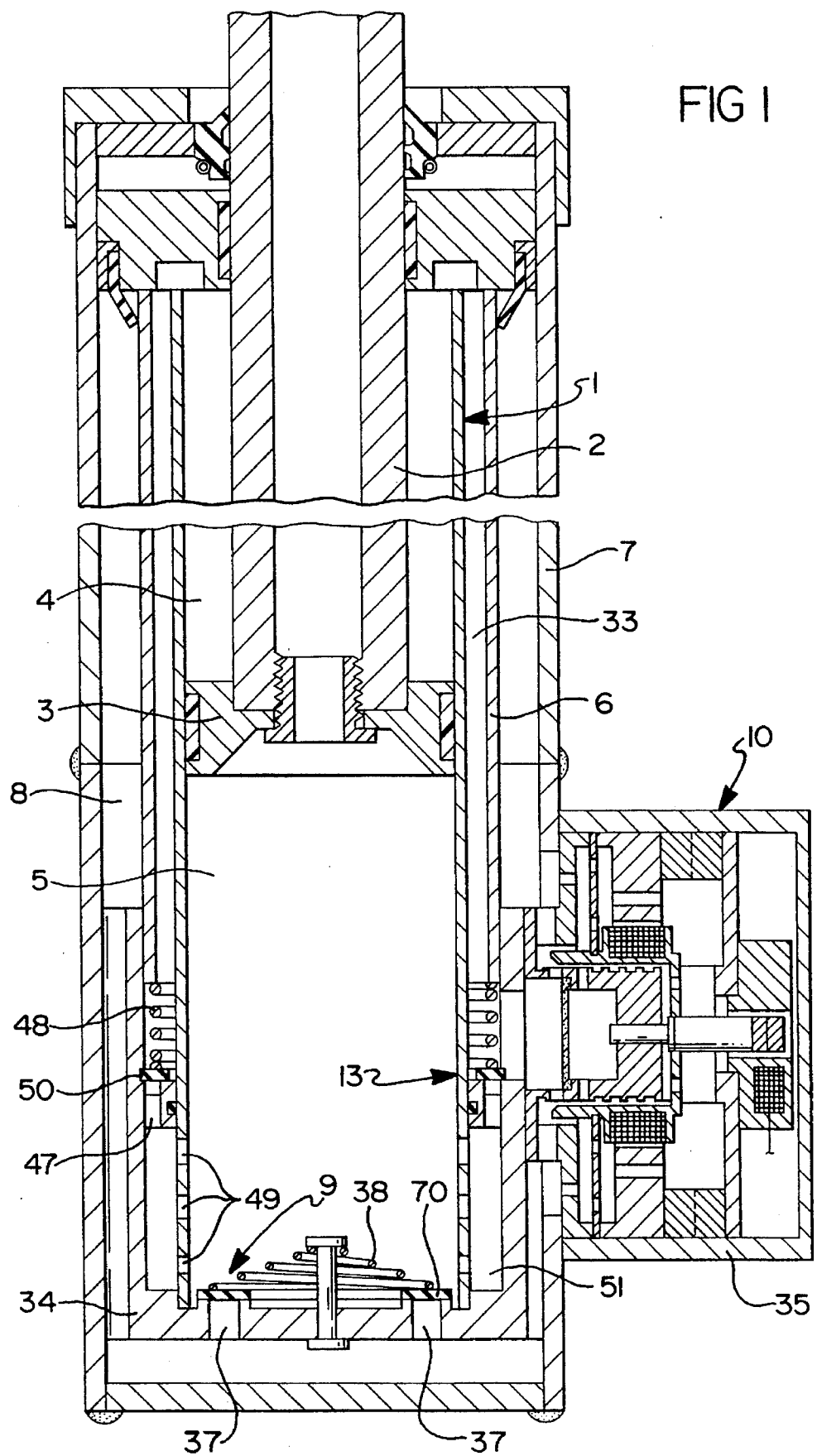
FIG. 1 is a diagrammatic sectional representation of the controllable vibration absorber of the present invention which is equipped with the inventive absorber valve.

The controllable vibration absorber illustrated diagrammatically in FIG. 1 is comprised of a power cylinder 1 and a tube 6 being disposed coaxially with said power cylinder 1, so that a connecting duct 33 is formed between them. Coaxially with the power cylinder 1, respectively with the tube 6, an external tube 7 is, then, disposed which defines, jointly with said tube 6, a balancing chamber 8 which has a circular ring-shaped cross section, is partly filled with oil and which interacts with the connecting duct 33. By means of a piston 3 being slidable by a piston rod 2 the internal space of the power cylinder 1 is subdivided into a first power chamber 4 which is positioned above said piston 3 and a second power chamber 5 which is positioned beneath said piston 3.

In the bottom range of the illustrated vibration absorber there is a valve assembly not identified in more detail and substantially composed of a non-return valve 9 which is effective in the traction stage, of a switch valve 13 constituted by a second non-return valve and effective in the thrust stage, and of a controllable absorber valve which as a whole bears reference numeral 10. In this configuration, the two non-return valves 9, 13 are preferably arranged in a valve housing 34 which simultaneously accommodates the absorber valve 10.

The first non-return valve 9 is comprised of a valve disc 70 which is prestressed by a spring 38, which interacts with passages 37 being provided in the valve housing 34 and which renders possible an intake of the oil from the balancing chamber 8 into the second power chamber 5 in the traction stage. The switching valve, respectively the second non-return valve 13, which is subjectible to the pressure existing within the second power chamber 5 is formed by a valve disc 50 which is prestressed by a spring 48, is arranged radially outside the power cylinder 1, and which interacts with passages 47 being configured in the valve housing 34 and extending in axial direction. In its lower range (in the lower final position of stroke of the piston 3) said power cylinder 1 is provided with openings 49 which can be passed over partly or totally by the piston 3. Said openings 49 end up in an annular chamber 51 which is defined in radial direction (and axially from beneath) by the valve housing 34 and in axial direction by the second non-return valve 13.

The absorber valve 10 which is designed as a single-stage slide valve is positioned within an absorber valve housing 35 forming part of the valve housing 34, preferably vertically in respect of the longitudinal axis of the vibration absorber and serves to vary the cross-sectional area of flow of the connection between the connecting duct 33 and the balancing chamber 8. As can be seen, in particular, from FIG. 2, the absorber valve 10 consists of a substantially cylindrical guide element 11 which is furnished with cross-sectional areas of flow 12 and on which a preferably cup-shaped or bushing-shaped valve body 14 is guided forming the carrier 19 of an electric plunger coil 15. Coil 15 along with a ring-shaped pole piece 16, permanent magnet 17, and bottom plate 18 (being abutted against the permanent magnet 17) forms an electromechanical transducer 20.

The cross-sectional areas of flow 12 terminate, on one side, in a cylindrical recess 21 which is configurated in the guide element 11 and which in the assembled condition of the absorber valve 10 is in connection with the connecting duct 33. On the other side chambers 12 terminate into annular chamber 22 which is connected to the balancing chamber 8 through outlet ducts 23. In this configuration, the outlet ducts 23 are defined by a cover 24 which is formed in its center with a circular opening not identified in detail through which both the guide element 11 and the valve body 14 extend.

The valve body 14 is preferably suspended on a disc-shaped bending spring 25 which is clamped in at its external edge between the cover 24 and the pole piece 16. The guide element 11 and the valve body 14 are dimensioned such that a radial slot 26 is configurated between them. A plurality of pressure-relieving grooves 27 being configurated one aside the other on the surface of the guide element 11. Pressure agent ducts 28 terminate in recess 21 and preceded by a filter element 29. Ducts 28 terminate into slot 26.

At the bottom of the recess 21 there is an axial bore 31 accommodating a cylindrical element 32 which is loosely abutted with the valve body 14 in axial direction and whose front surface is subjectibis to the hydraulic pressure existing within the vibration absorber.

It will be of advantage in order to effectively balance the forces of flow which occur during operation of the inventive absorber valve 10 in the range of the cross-sectional areas of flow 12 when the control edge 36 preferably includes a truncated cone-shaped configuration. This configuration allows the forces due to fluid flow to be balanced during operation of valve 10. In addition, it is expedient to provide an annular groove 39 in the outlet range of the absorber valve 10 which serves as a collecting point for any mud particles (or contaminants) penetrating into the cross-sectional areas of flow 12. In order to balance the volumes within the absorber valve 10, it will be necessary to provide bores 41, 42, 43, respectively passages 40, in the cover 24, in the pole piece 16, in the valve body 14, and in the bending spring 25.

It is necessary to sense the actuating travel of the valve body 14 in order to attain the family of characteristics illustrated in a diagrammatic representation in FIG. 3. That is to say, the hydraulic pressure existing in the vibration absorber depends on the volumetric flow rate through the absorber valve 10 at different ratings of the energizing current (which actuates the electromechanical transducer 20). To this end, a measuring apparatus 30 is directly coupled to the valve body 14 which monitors changes of magnetic variables being caused by the adjustment of the valve body 14. The measuring apparatus 30 shown in FIG. 2 consists of a permanent magnet 45 which is fixed to the valve body 14, specifically to an element 44 being connected to the valve body 14, and of a sensor element 46 interacting with it, for example of a Hall element 46" (FIG. 5B) or a magneto-resistive element 46' (FIG. 5A). However, other design versions of the measuring apparatus can, of course, be imagined which is, for example, constituted by a reflecting light barrier 30' (FIG. 5C) or may work by the eddy current principle arrangement 30" (FIG. 5D).

The output signal of the measuring apparatus 30 is preferably conveyed to an electric circuit 60 (FIG. 4) which affords an actuation of the electromechanical transducer 20 in such a way that in the range of low volumetric flow rates (A—of FIG. 3) a restricting function is performed and in the range of more sizeable volumetric flow rates (B—of FIG. 3) a pressure-limiting function is performed.

The method of functioning of the mentioned circuit will be described in more detail in the following text in conjunction with FIG. 4 which illustrates the structure of a control loop for the realization of the inventive process for the continuous adjustment of the vibration absorbing force of a controllable vibration absorber equipped with the absorber valve 10 in accordance with FIG. 2.

As can be seen from FIG. 4, the output signals ($Y_{set}$) of a chassis regulator 57 (which makes up part of the chassis regulating system and represent the desired actuating lift of the valve body 14 of the inventive absorber valve 10) are conveyed, on one hand, to a comparator circuit 52 jointly with the output signal ($Y_{set}$) of the measuring apparatus 30 mentioned before and, on the other hand, to a first amplifier 53. In comparator circuit 52 a differential value is computed which is conveyed to a second amplifier 54 as an input signal. The output signal of said second amplifier 54 is conveyed to a variable delimiter 55 as an input signal in which, if needs be, it will be limited depending on the output signal of the first amplifier 53. The output signal of the variable delimiter 55 is, finally, conveyed to an electrical output stage 56 which supplies electric current for the actuation of the electromechanical transducer 20.

Figure 2:
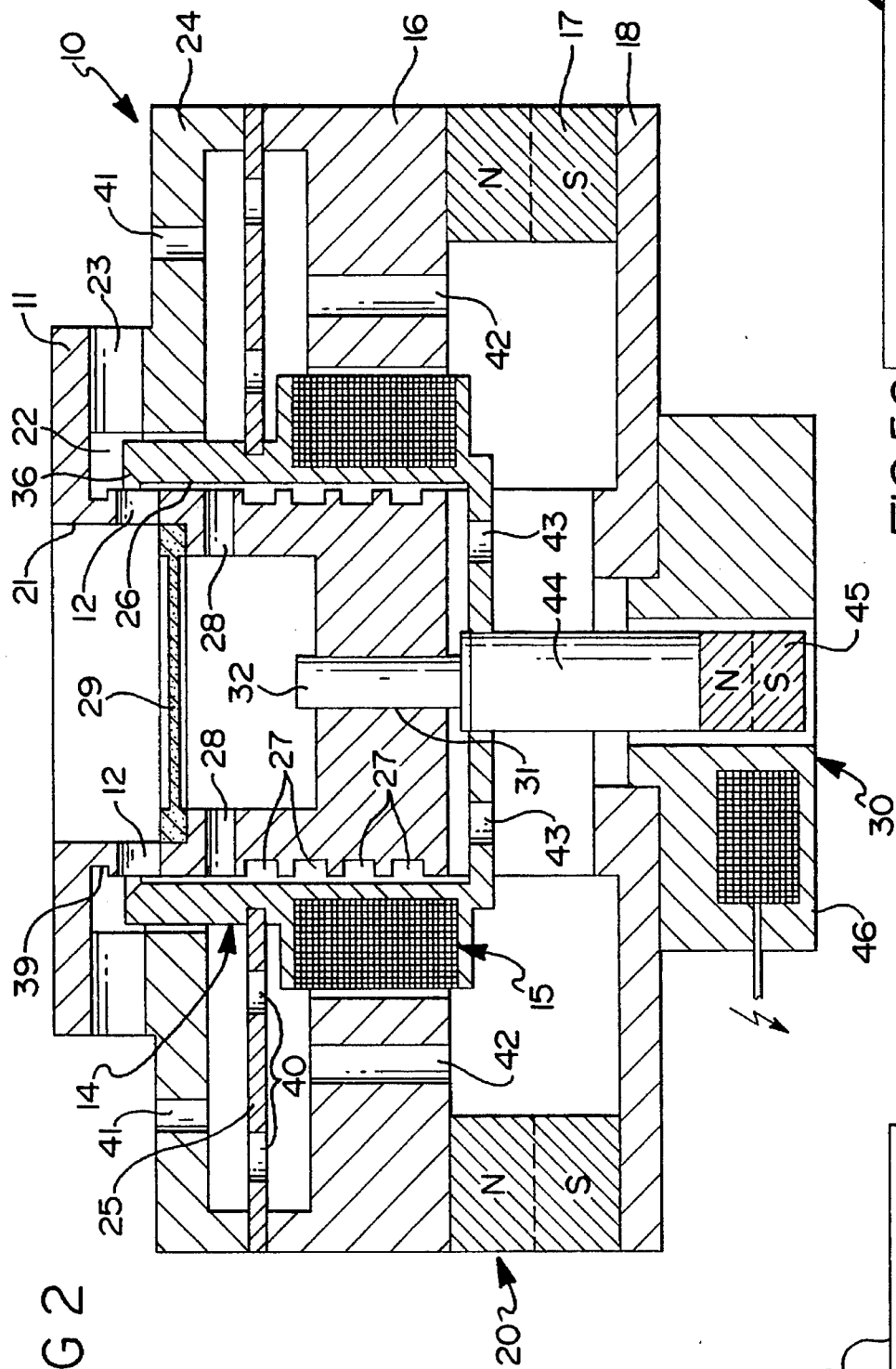
FIG. 2 is the inventive absorber valve of FIG. 1, in an upscaled representation.

The section of the signal flow diagram as per FIG. 4 bearing reference numeral 58 represents the equivalent-circuit diagram of the inventive absorber valve 10 shown in FIG. 2, in which the functional block 61 (Kmag, Tm) shows the temporal proportional control behavior of the electromechanical transducer 20 which is assumed in this instance as a proportional link with non-quadratic (first order) lag. The signal addition identified by reference numeral 62 shows the balance of forces of the most important force components occurring in the absorber valve 10, whereas the functional block 63 represents the effective surface A1 of the cylindrical element 32 which is abutted with the valve body 14 and which serves for a pressure reduction. Reference numeral 64 denotes a first integrator whose output signal corresponds to the acceleration y of the valve body 14, the weight of all moving absorber valve components being denoted by the reference m. The functional block 65 (D) represents a frictional force being proportional to the velocity, while the functional block 66 shows the behavior of the bending spring 25 (FIG. 2) with a spring rate C. In the second integrator 67 a signal originates which corresponds to the actuating travel y of the valve body 14, while the functional block 68 shows the behavior of the measuring apparatus 30 (FIG. 2). With the functional block 69 the restricting effect of the absorber valve 10 is taken account of in an extremely simplified manner in the signal flow diagram, Q denoting the volumetric flow rate passing through the absorber valve 10 and p the adjusted vibration absorber pressure.

The second section of the signal flow diagram in FIG. 4 bearing reference numeral 59 shows the behavior of the vibration absorber in FIG. 1 in a simplified representation, A2 denoting the effective surface of the piston 3 (FIG. 1) which is formed by the annular piston surface (total piston surface minus cross-sectional area of the piston rod) in the traction stage and by the cross-sectional area of the piston rod in the thrust stage. Finally, x denotes the input variable, respectively the velocity of the piston rod, and F the originating vibration absorbing force.

For the following description of the functioning of the control loop illustrated in FIG. 4, it is initially assumed that a mean characteristic out of the total family of characteristics illustrated in FIG. 3 is to be adjusted in a control process. A determined actuating travel ($Y_{set}$) of the valve body 14 is preset by the chassis regulator 57. In case there is no volumetric flow rate passing through the absorber valve 10 the control signals originating in the control loop will bring about an adjustment of the valve body 14 into the desired position. As small volumetric flow rates increase (range A in FIG. 3) the pressure in the vibration absorber will rise in accordance with the first section I of the desired characteristic, so that the absorber valve will perform a restricting function. In this instance, the pressure existing within the vibration absorber will act upon the front surface of the element 32 being abutted with the valve body 14, so that a force component will originate which acts in the opening direction of the absorber valve 10. Through the control loop this force component will cause an increase of the actuating force which is applied by the electromechanical transducer 20 to the valve body 14, so that a constant cross-sectional area of restriction is safeguarded.

In the event of a further increase of the volumetric flow rate, which corresponds to a vibration absorber pressure P1, a further increase of the actuating force applied by the electromechanical transducer 20 would have to take place in order to maintain the valve body 14 in the adjusted position. This will, however, no longer be possible in the range of more sizeable volumetric flow rates (range B in FIG. 3) on account of the function of the variable delimiter 55 depending on the output signal $Y_{set}$ of the chassis regulator 57. For this reason, a further adjustment of the valve body 14 in the opening direction will take place which will result in a pressure limitation in accordance with section II of the desired characteristic.

In the illustrated example a modification of the feature of the family of characteristics can be brought about by modifications of the amplification factors of the two amplifiers 53 and 54.

What is claimed is:

1. A vibration absorber valve, comprising:

a valve body, an electromechanical transducer for actuating said valve body, a measuring apparatus for monitoring the actuating travel of said valve body, an electric circuit coupled to said measuring apparatus and in such a way that in a first range of volumetric flow rate of a fluid through said valve body, a first restricting function is performed and in a second range of volumetric flow rate of a fluid through said valve body, a second restricting function is performed.

2. A vibration absorber valve as claimed in claim 1, wherein said electromechanical transducer is configured in the shape of a plunger coil which interacts with a permanent magnet, said transducer including a carrier formed by said valve body.

3. A vibration absorber valve as claimed in claim 2, wherein said valve body is suspended on a bending spring which is fixed in an absorber valve housing.

4. A vibration absorber valve as claimed in claim 3, wherein said bending spring is configured as a spring plate which is furnished with passages.

5. A vibration absorber valve as claimed in claim 2, wherein current supplied to said plunger coil takes place through a bending spring.

6. A vibration absorber valve as claimed in claim 1, wherein said valve body is configured in the shape of a bushing which is slidingly guided on a cylindrical guide element and which interacts with a plurality of cross-sectional areas of flow being provided in said guide element.

7. A vibration absorber valve as claimed in claim 6, wherein during the interaction of the said valve body and said cross-sectional areas of flow a balancing of the hydraulic forces takes place which occur in the first and second ranges of volumetric flow rate.

8. A vibration absorber valve as claimed in claim 7, wherein said valve body and a balancing chamber disposed downstream of said cross-sectional areas of flow as seen in a flow direction are configured such that a deviation of the volumetric flow is ensured.

9. A vibration absorber valve as claimed in claim 8, wherein said valve body includes a control edge having a truncated cone shape and said control edge interacts with said cross-sectional areas of flow.

10. A vibration absorber valve as claimed in claim 8, wherein said cross-sectional areas of flow terminate in an annular hydraulic chamber which is connected to an outlet duct, wherein a static pressure coming about in said annular chamber enables a hydraulic force component which counteracts Bernouille forces acting on said valve body.

11. A vibration absorber valve as claimed in claim 6 wherein said guide element includes radial pressure-relieving grooves which terminate in a slot located between said valve body and said guide element.

12. A vibration absorber valve as claimed in claim 11 wherein said guide element is furnished with pressure agent ducts which are linked to said slot and which are preceded by a filter element.

13. A vibration absorber valve as claimed in claim 12, wherein said guide element is provided with a bore within which a cylindrical element is guided which loosely abuts axially said valve body.

14. A vibration absorber valve as claimed in claim 3, wherein said guide element includes an annular groove located adjacent said cross-sectional areas of flow.

15. A vibration absorber valve as claimed in claim 1, wherein said measuring apparatus includes means for monitoring changes of magnetic variables which are caused by an adjustment of said valve body.

16. A vibration absorber valve as claimed in claim 15, wherein said measuring apparatus is formed by a permanent magnet being fixed to said valve body, respectively to an element coupled to said valve body, and by a sensor element recording a magnetic field of said permanent magnet.

17. A vibration absorber valve as claimed in claim 16 wherein said sensor element is formed by a magneto-resistive element.

18. A vibration absorber valve as claimed in claim 16 wherein said sensor element is formed by a Hall element.

19. A vibration absorber valve as claimed in claim 15, wherein said measuring apparatus is formed by a permanent magnet which is coupled to said valve body and a sensor element which interacts with said permanent magnet.

20. A vibration absorber valve as claimed in claim 1, wherein said measuring apparatus is constituted by a reflecting light barrier.

21. A vibration absorber valve as claimed in claim 1, wherein said measuring apparatus is configured in the shape of an arrangement working by the eddy current principle.

22. A method of adjusting the vibration absorbing force of a controllable vibration absorber which is used in a chassis regulating system for automotive vehicles and which is furnished with an absorber valve being actuatable through an electrical output stage, the chassis regulating system being furnished with sensors for monitoring the driving dynamics of the automobile and with an electronic chassis regulator whose output signals serve to actuate said absorber valve, comprising the steps of:

conveying output signals ($Y_{set}$) of the chassis regulator to a comparator circuit jointly with output signals of a measuring apparatus, monitoring the actuating travel of the valve body using the measuring apparatus, conveying said chassis regulator output signals ($Y_{set}$) to a first amplifier, within the comparator circuit forming a differential value between said chassis regulator output signals ($Y_{set}$) and a feed back signal comprising the measuring apparatus output signals, transmitting the differential value output of said comparator circuit to a second amplifier, conveying the outputs of the first and second amplifiers to a variable delimiter which limits the output signals of the second amplifier depending on the output signals of the first amplifier, and, conveying the output of said delimiter to the electrical output stage of the absorber valve to thereby actuate said absorber valve to adjust the vibration absorbing force.

23. A vibration absorber valve as claimed in claim 22, wherein the pressure (p) adjusted within the vibration absorber fulfills, in the static condition, the following equation:

$$p = \frac{K_{mag} \cdot i - C \cdot y}{A_1} = K_1 \cdot i + K_2 \cdot y,$$

in which:

$K_{mag}$ is the proportional control factor of the electromechanical transducer, i is the current being supplied to the said plunger coil, C is the spring rate of the said bending spring, y is the actuating travel of the said valve body, Al is the area of the cylindrical element which is abutted with the said valve body.

* * * * *